(12) United States Patent
Lee et al.

(10) Patent No.: US 12,409,716 B2
(45) Date of Patent: Sep. 9, 2025

(54) COMPACT ELECTRIC DRIVE UNITS AND VEHICLES

(71) Applicant: GM GLOBAL TECHNOLOGY OPERATIONS LLC, Detroit, MI (US)

(72) Inventors: Chi Teck Lee, Novi, MI (US); James M. Hart, Belleville, MI (US); Christopher Michael Kaminski, Royal Oak, MI (US); Favian Zavala, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 362 days.

(21) Appl. No.: 18/305,132

(22) Filed: Apr. 21, 2023

(65) Prior Publication Data

US 2024/0351416 A1    Oct. 24, 2024

(51) Int. Cl.
*B60K 17/16* (2006.01)
*B60K 1/00* (2006.01)
*F16D 11/04* (2006.01)
*F16D 48/08* (2006.01)

(52) U.S. Cl.
CPC .............. *B60K 1/00* (2013.01); *B60K 17/165* (2013.01); *B60K 2001/001* (2013.01); *F16D 11/04* (2013.01); *F16D 48/08* (2013.01)

(58) Field of Classification Search
CPC .............. B60K 2001/001; B60K 17/02; B60K 17/16–20; F16D 2011/004; F16H 48/08; F16H 2048/364; F16H 48/22; F16H 48/30; F16H 2048/082; F16H 2048/204
See application file for complete search history.

(56) References Cited

U.S. PATENT DOCUMENTS

| | | | | |
|---|---|---|---|---|
| 1,239,990 | A | * 9/1917 | Ware | F16H 48/08 180/245 |
| 5,996,720 | A | * 12/1999 | Hunt | B60K 23/08 475/230 |
| 2013/0123058 | A1 | * 5/2013 | Markl | B60K 17/165 475/150 |
| 2016/0131240 | A1 | * 5/2016 | Cooper | F16H 48/24 475/221 |
| 2017/0368934 | A1 | * 12/2017 | Edelen | F16H 48/32 |

(Continued)

FOREIGN PATENT DOCUMENTS

| | | | |
|---|---|---|---|
| CN | 111089123 B | * 8/2021 | ............ F16D 27/14 |
| DE | 3027806 A1 | 2/1982 | |
| DE | 102019219028 A1 | 7/2020 | |

*Primary Examiner* — Ernesto A Suarez
*Assistant Examiner* — Lillian T Nguyen
(74) *Attorney, Agent, or Firm* — Ingrassia Fisher & Lorenz LLP

(57) ABSTRACT

Compact electric drive units and vehicles with such drive units are provided. An exemplary electric drive unit includes an electric motor configured to provide an electric motor torque; an input differential configured to split the electric motor torque into a first path and a second path; a final drive gear on each path; a pinion gear on each path; and a rear transfer shaft assembly and a front transfer shaft assembly on each path. Further, each pinion gear is configured to transfer torque to a respective rear transfer shaft assembly and a respective front transfer shaft assembly, and the respective rear transfer and front transfer shaft assemblies are configured to transfer torque to the respective final drive gear.

20 Claims, 12 Drawing Sheets

(56) References Cited

U.S. PATENT DOCUMENTS

2018/0100569 A1\* 4/2018 Imafuku ............. F16H 25/2204
2018/0112755 A1\* 4/2018 Littlefield ................ B60K 1/00
2020/0158218 A1\* 5/2020 Himmelbauer ........ B60K 23/04

\* cited by examiner

COMPACT ELECTRIC DRIVE UNITS AND VEHICLES

INTRODUCTION

The disclosure relates to a multiple-axis torque sharing electric drive unit that employs a single electric motor to drive a pair of opposite side wheels in a vehicle.

Modern motor vehicles are typically configured as either two-wheel-drive or all-wheel-drive. Either type of a vehicle may employ a conventional powertrain, where a single engine is used to propel the vehicle, an electric powertrain, where an electric motor is used to propel the vehicle, or a hybrid powertrain, where two or more distinct power sources, such as an internal combustion engine and an electric motor, are used to accomplish the same task.

An all-wheel-drive hybrid vehicle may be configured as an axle-split vehicle. In such a vehicle, independent power-sources, such as an internal combustion engine and an electric motor, are set up to independently power individual vehicle axles that are operatively connected to the respective power-sources, thus generating on-demand all-wheel-drive propulsion. In such an axle-split hybrid vehicle employing an engine and an electric motor, the electric motor may be capable of propelling the vehicle via the respective axle while the engine is shut off.

Each powered axle typically includes a final drive assembly with a differential that allows opposite side, i.e., left (driver) and right (passenger) side, driven wheels to rotate at different speeds when the vehicle negotiates a turn. Specifically, the differential permits the driven wheel that is traveling around the outside of the turning curve to roll farther and faster than the driven wheel traveling around the inside of the turning curve, while approximately equal torque is applied to each of the driven wheels. An increase in the speed of one driven wheel is balanced by a decrease in the speed of the other driven wheel, while the average speed of the two driven wheels equals the input rotational speed of the drive shaft connecting the power-source to the differential.

The need for new and improved drive units continues with the design of lighter and more compact vehicles, particularly for vehicles driven by electric motors. Accordingly, it is desirable to provide a cost-effective, compact drive unit. Furthermore, other desirable features and characteristics of the present disclosure will become apparent from the subsequent detailed description and the appended claims, taken in conjunction with the accompanying drawings and the foregoing introduction.

SUMMARY

Compact electric drive units and vehicles with such drive units are provided. An exemplary electric drive unit includes an electric motor configured to provide an electric motor torque; an input differential configured to split the electric motor torque into a first path and a second path; a first final drive gear on the first path and a second final drive gear on the second path; a first pinion gear on the first path and a second pinion gear on the second path; a first rear transfer shaft assembly and a first front transfer shaft assembly on the first path; and a second rear transfer shaft assembly and a second front transfer shaft assembly on the second path; wherein the first pinion gear is configured to transfer torque to the first rear transfer shaft assembly and to the first front transfer shaft assembly; wherein the first rear transfer shaft assembly and the first front transfer shaft assembly are configured to transfer torque to the first final drive gear; wherein the second pinion gear is configured to transfer torque to the second rear transfer shaft assembly and the second front transfer shaft assembly; and wherein the second rear transfer shaft assembly and the second front transfer shaft assembly are configured to transfer torque to the second final drive gear.

An exemplary electric drive unit includes an electric motor configured to provide an electric motor torque; an input differential; a pinion gear, wherein the input differential is configured to selectively transmit torque to the pinion gear; a rear transfer shaft assembly and a front transfer shaft assembly, wherein the pinion gear is configured to transfer torque to the rear transfer shaft assembly and to the front transfer shaft assembly; a final drive gear, wherein the rear transfer shaft assembly and the front transfer shaft assembly are configured to transfer torque to the final drive gear; and a locking device configured to selectively connect and disconnect the input differential from the pinion gear.

An exemplary vehicle includes an electric motor configured to provide an electric motor torque; a first pinion gear on a first path and a second pinion gear on a second path; a first rear transfer shaft assembly on the first path and a second rear transfer shaft assembly on the second path; a first front transfer shaft assembly on the first path and a second front transfer shaft assembly on the second path; a first final drive gear on the first path and a second final drive gear on the second path; and a first wheel on the first path and a second wheel on the second path; wherein the first pinion gear is configured to transfer torque to the first rear transfer shaft assembly and the first front transfer shaft assembly; wherein the first rear transfer shaft assembly and the first front transfer shaft assembly are configured to transfer torque to the first final drive gear; wherein the second pinion gear is configured to transfer torque to the second rear transfer shaft assembly and the second front transfer shaft assembly; and wherein the second rear transfer shaft assembly and the second front transfer shaft assembly are configured to transfer torque to the second final drive gear.

DESCRIPTION OF THE DRAWINGS

The present disclosure will hereinafter be described in conjunction with the following drawing figures, wherein like numerals denote like elements, and wherein.

DETAILED DESCRIPTION

Figure 1:
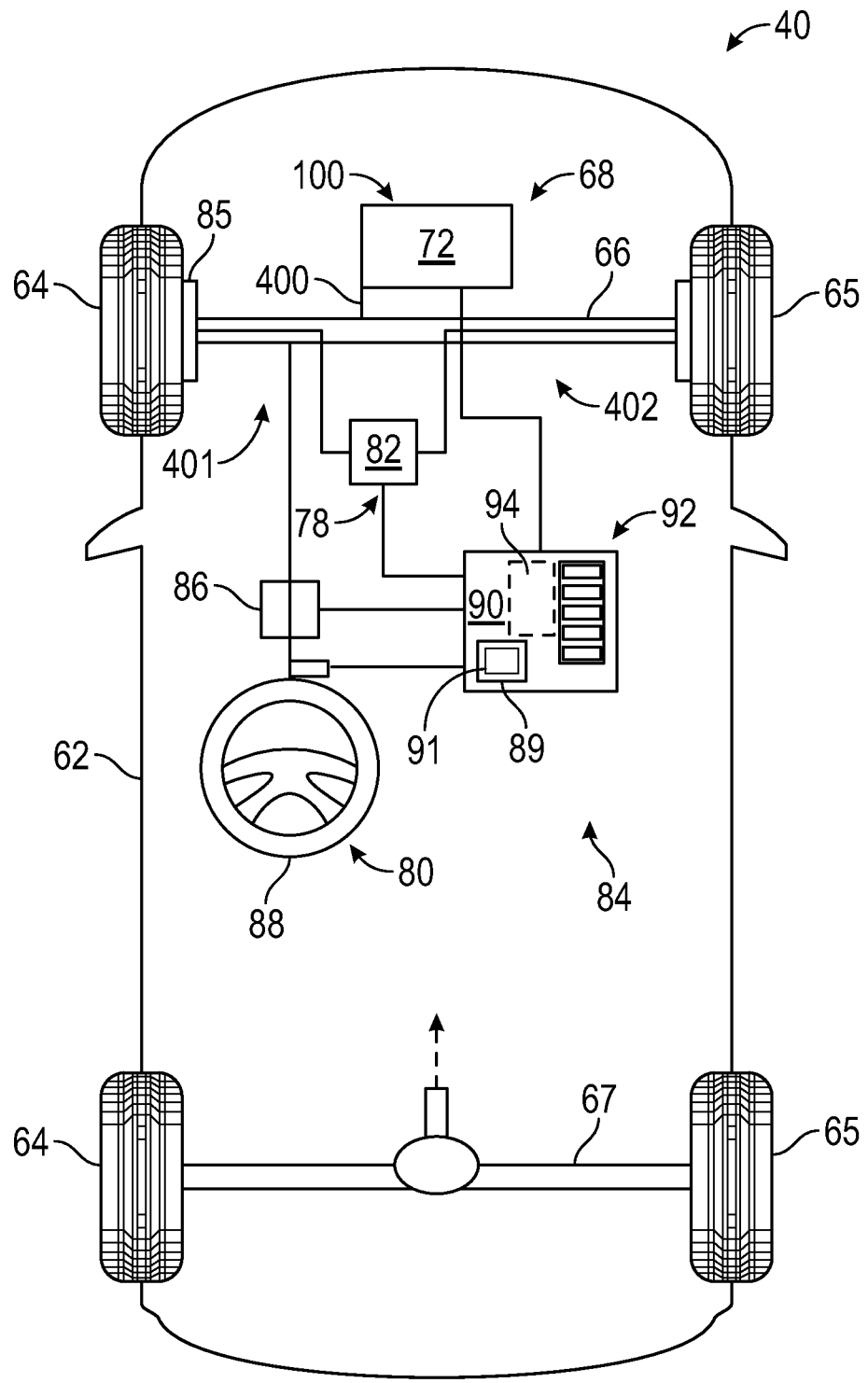
FIG. 1 is a functional block diagram of a vehicle, in accordance with exemplary embodiments.

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Spatially relative terms, such as "front", "rear", "above", "below", "behind" "top", "bottom", "under", "over", "side", and the like, may be used herein for ease of description to describe one element or feature's relationship to another element(s) or feature(s) as illustrated in a figure or figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Various connections, such as between a driving gear and a driven gear, and between a gear and an axial shaft, are described herein. In exemplary embodiments, a connected driving gear and driven gear mesh with one another. Specifically, each gear has cut gear teeth, and the cut gear teeth mate with one another such that the driving gear may directly contact, engage with, and drive the driven gear. Thus, the connection therebetween is provided between the cut gear teeth. In exemplary embodiments, a gear that is coupled or mounted to an axial shaft is directly fixed to the axial shaft or sleeve, such the gear and shaft or sleeve rotate together. In certain embodiments, cut teeth are formed on a shaft to define a gear that is coupled or mount to the shaft.

Referring to FIG. 1, a vehicle 40 is illustrated in functional block diagram form. In various embodiments, the vehicle 40 is an automobile. The vehicle 40 may be any one of a number of different types of automobiles, such as, for example, a sedan, a wagon, a van, a truck, or a sport utility vehicle (SUV), and may be two-wheel drive (2 WD) (i.e., rear-wheel drive or front-wheel drive), four-wheel drive (4 WD) or all-wheel drive (AWD), and/or various other types of vehicles in certain embodiments. In certain embodiments, the vehicle 40 may also include another type of mobile platform.

As depicted in FIG. 1, the vehicle 40 includes a body 62 that is arranged on or integrated with a chassis. The body 62 substantially encloses other components of the vehicle 40. The vehicle 40 also includes a plurality of wheels 64 and 65, which may be referred to as left or driver-side wheels 64 and right or passenger-side wheels 65. The wheels 64 and 65 are each rotationally coupled to the chassis near a respective corner of the body 62 to facilitate movement of the vehicle 40. In one embodiment, the vehicle 40 includes four wheels 64 and 65, although this may vary in other embodiments (for example for trucks and certain other vehicles).

A drive system 68 is mounted in the vehicle 40, and drives the wheels 64 and 65, for example via axles 66, 67. In certain embodiments, the drive system 68 includes a drive unit 100. In certain exemplary embodiments, the drive unit 100 includes a powerplant 72, such as an internal combustion engine and/or an electric motor/generator, that is coupled with a transmission system 400. In exemplary embodiments, the powerplant 72 is an electric motor/generator. In certain embodiments, the drive system 68 may vary, and/or two or more drive systems 68 may be used. By way of example, the vehicle 40 may also incorporate any one of, or combination of, a number of different types of drive unit 100, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the vehicle 40 also includes a braking system 78 and a steering system 80 in various embodiments. In exemplary embodiments, the braking system 78 controls braking of the vehicle 40 using an actuator 82 that may be controlled via inputs provided by a driver, such as through a brake pedal as the actuator 82, and in certain embodiments, via automatic control by a control system 84. The braking system 78 incudes brakes, such as brake 85, at any of the number of wheels 64 and 65. Also in exemplary embodiments, the steering system 80 controls steering of the vehicle 40 via an actuator 86, such as with inputs from a steering wheel 88 (e.g., in connection with a steering column coupled to the axle 66 and/or the wheels 64 and 65), that are controlled via inputs provided by a driver, and in certain embodiments via automatic control via the control system 84.

In the embodiment depicted in FIG. 1, the control system 84 is coupled with various systems including the braking system 78 and the steering system 80 of the vehicle 40. In various embodiments, the control system 84 may also be coupled to one or more other systems and/or components of the vehicle 40 and includes a controller 90. As illustrated in FIG. 1, the controller 90, and the powertrain controller 89 are a part of, or comprise, a computer system 92. It will be appreciated that the controller 90 may otherwise differ from the example depicted in FIG. 1. The controller 90 may be configured as any number of controllers and/or microcontrollers in communication with each other.

As illustrated in FIG. 1, the controller 90 is coupled with various devices and systems of the vehicle 40, such as the braking system 78 and the steering system 80. The controller 90 may accept information from various sources, process that information, and provide control commands based thereon to effect outcomes such as operation of the vehicle 40 and its systems, including of the braking system 78. In the depicted embodiment, the controller 90 includes a processor 94 including a memory device and storage device. The processor 94 performs the computation and control functions of the controller 90, and may be any type of processor or multiple processors, single integrated circuits such as a microprocessor, or any suitable number of integrated circuit devices and/or circuit boards working in cooperation to accomplish the functions of a processing unit. During operation, the processor 94 may execute one or more programs and may use data, each of which may be stored within the processor 94, the processor 94 controls the general operation of the controller 90 in executing the processes described herein, such as the processes and methods described in greater detail below.

Still referring to FIG. 1, the controller 90 is coupled with various actuators including the actuators 82, 86 and the drive unit 100. The controller 90 is also coupled with various sensors that sense observable conditions of the vehicle 40. In this embodiment, the sensing devices include, but are not limited to, a braking sensor such as a pedal position sensor, a steering angle sensor, an acceleration sensor, and a torque request sensor, such as at the accelerator pedal or throttle.

As shown in FIG. 1, in various embodiments, the controller 90 is coupled to, among other devices, the sensors, the braking system 78, the steering system 80, the drive unit 100, and/or one or more other systems, devices, and/or components of the vehicle 40.

The controller 90 may provide the drive unit 100 control functions of the vehicle 40. In embodiments, a powertrain controller 89 may be coupled in the control system 84 and in certain embodiments may be included in the controller 90. In embodiments, the powertrain control module 91 may reside in, or may comprise, the powertrain controller 89, which may be a part of the controller 90 or which may be a separate powertrain controller 89 coupled with the controller 90. The powertrain controller 89 may provide the various functions of controlling the drive unit 100, such as by providing a torque command to operate the drive unit 100 to propel the vehicle 40.

Figure 2:
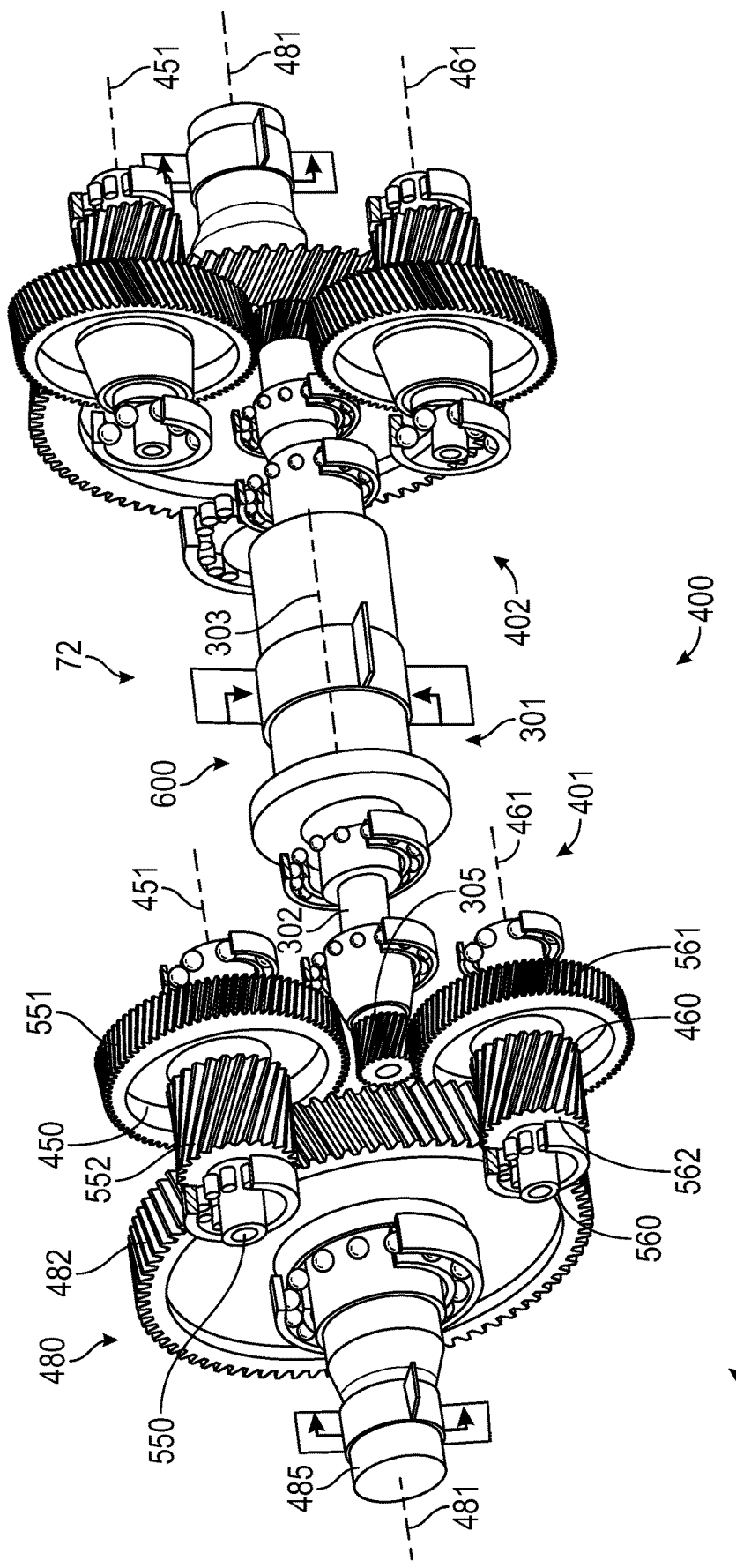
FIG. 2 is a perspective view of an electric drive unit for the vehicle of FIG. 1, in accordance with exemplary embodiments.

In FIG. 2, a portion of an exemplary drive unit 100 including a portion of power plant 72 and transmission system 400 is illustrated. As shown, a portion of the power plant 72 is an electric motor configured to provide an electric motor torque and includes a rotor 301 that rotates about a rotor axis 303. The rotor 301 is interconnected with an input differential 600 configured to selectively split the electric motor torque into a first path 401 and a second path 402. Cross-referencing FIGS. 1 and 2, the first path 401 extends from the input differential 600 to wheel 64, and the second path 402 extends from the input differential 600 to wheel 65.

In the exemplary embodiment shown in FIG. 2, the input differential 600 is configured to selectively transmit torque from the rotor 301 to two pinion shafts or drive shafts 302 that are each configured to rotate about the rotor axis 303. Specifically, the drive shafts 302 are coaxial. Further, the drive shafts 302 are each configured to rotate a pinion gear 305. In exemplary embodiments, each pinion gear 305 is mounted on a respective drive shaft 302. The pinion gears 305 are configured to rotate about the rotor axis 303.

As further shown in FIG. 2, each pinion gear 305 is configured to transmit torque to two parallel transfer shaft assemblies 450 and 460, which may be referred to as rear transfer shaft assembly 450 and front transfer shaft assembly 460. In the illustrated embodiment, each rear transfer shaft assembly 450 rotates about a rear axis 451 and each front transfer shaft assembly 460 rotates about a front axis 461.

In FIG. 2, each rear transfer shaft assembly 450 comprises a transfer shaft 550, a transfer gear 551, and a final drive pinion 552. In exemplary embodiments, each transfer gear 551 is formed on or mounted to the respective transfer shaft 550. In exemplary embodiments, each final drive pinion 552 is formed on or mounted to the respective transfer shaft 550. As a result, each transfer shaft 550, transfer gear 551, and final drive pinion 552 rotates about the rear axis 451.

In FIG. 2, each front transfer shaft assembly 460 comprises a transfer shaft 560, a transfer gear 561, and a final drive pinion 562. In exemplary embodiments, each transfer gear 561 is formed on or mounted to the respective transfer shaft 560. In exemplary embodiments, each final drive pinion 562 is formed on or mounted to the respective transfer shaft 560. As a result, each transfer shaft 560, transfer gear 561, and final drive pinion 562 rotates about the front axis 461.

As further shown in FIG. 2, each pair of parallel transfer shaft assemblies 450 and 460 is configured to transmit torque to a respective final drive assembly 480. Each final drive assembly 480 includes a final drive gear 482 and a drive shaft or output shaft 485. Each final drive gear 482 is configured to rotate about a drive axis 481. Specifically, each final drive gear 482 is coupled or mounted to the drive shaft 485 or output shaft 485 rotatable about drive axis 481.

Thus, in FIG. 2, first torque path 401 includes an interconnected drive shaft 302; pinion gear 305; rear transfer shaft assembly 450, including transfer shaft 550, transfer gear 551, and final drive pinion 552; final drive gear 482, and drive shaft 485.

Further, in FIG. 2, second torque path 402 includes an interconnected drive shaft 302; pinion gear 305; rear transfer shaft assembly 450, including transfer shaft 550, transfer gear 551, and final drive pinion 552; and final drive assembly 480, including final drive gear 482 and drive shaft 485.

In each torque path 401 and 402, the pinion gear 305 is configured to transfer torque to the rear transfer shaft assembly 450 and to the front transfer shaft assembly 460; and the rear transfer shaft assembly 450 and the front transfer shaft assembly 460 are configured to transfer torque to the final drive assembly 480. Further, in the torque path 401 and 402, the final drive assembly 480 is configured to transfer torque to the output shaft or drive shaft 485.

In certain embodiments, in each torque path 401 and 402, the pinion gear 305 meshes with the rear transfer shaft assembly 450 and the front transfer shaft assembly 460; and the rear transfer shaft assembly 450 and the front transfer shaft assembly 460 mesh with the final drive assembly 480. More specifically, in each torque path 401 and 402, the pinion gear 305 meshes with the transfer gear 551 of the rear transfer shaft assembly 450, the pinion gear 305 meshes with the transfer gear 561 of the front transfer shaft assembly 460, the final drive pinion 552 of the rear transfer shaft assembly 450 meshes with the final drive gear 482 of the final drive assembly 480, and the final drive pinion 562 of the front transfer shaft assembly 460 meshes with the final drive gear 482 of the final drive assembly 480.

Each torque path 401 and 402 is provided with a first stage speed reduction from the pinion gear 305 to the rear transfer shaft assembly 450 and to the front transfer shaft assembly 460. Further, each torque path 401 and 402 is provided with a second stage speed reduction from the rear transfer shaft assembly 450 and from the front transfer shaft assembly 460 to the final drive assembly 480.

As shown in FIG. 2, the drive unit 100 includes four axes of rotation: rotor axis 303, rear axis 451, front axis 461, and drive axis 481, none of which are co-axial with one another.

Figure 3:
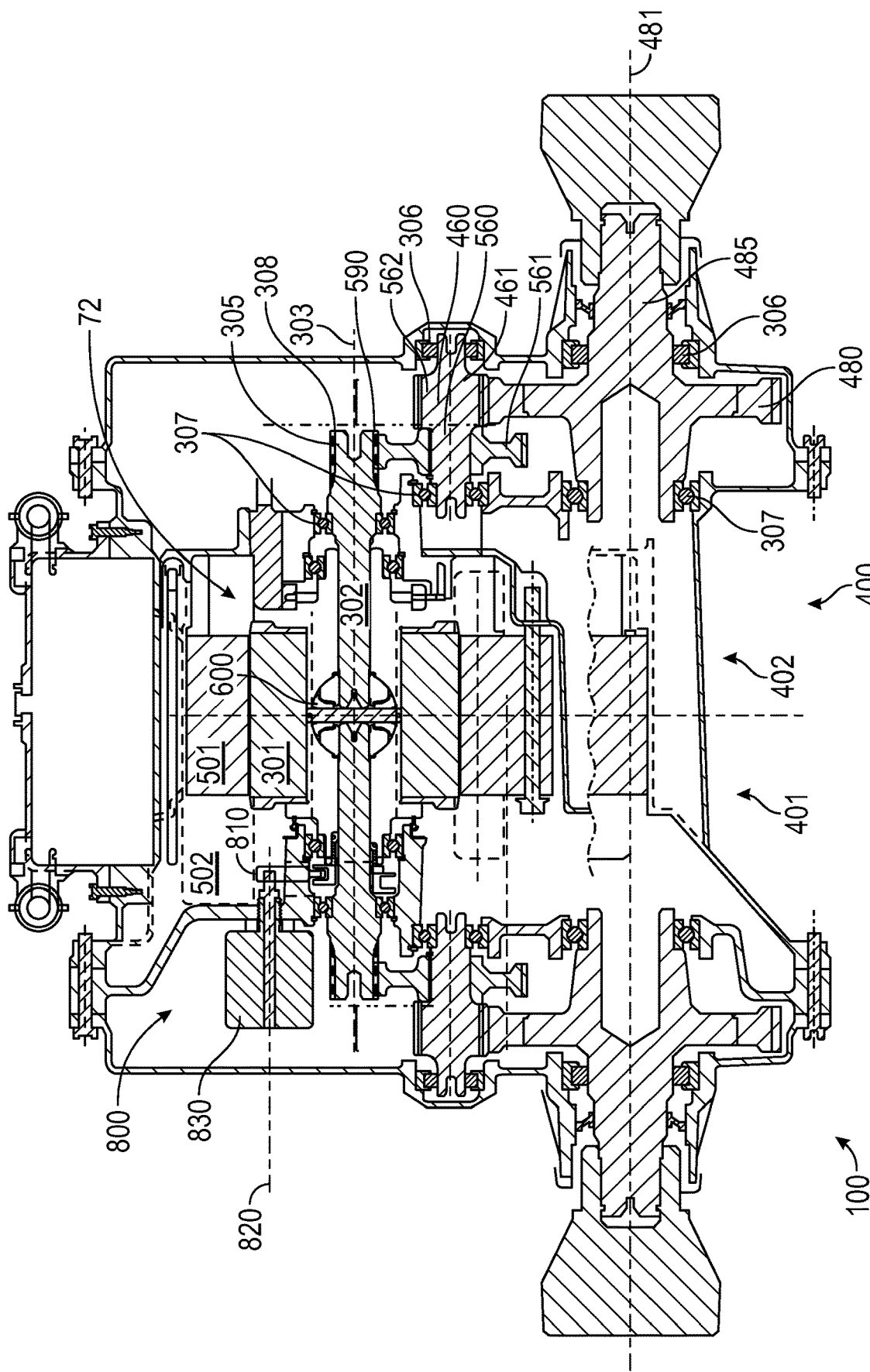
FIG. 3 is a front view schematic of the electric drive unit of FIG. 2, in accordance with exemplary embodiments.
Figure 4:
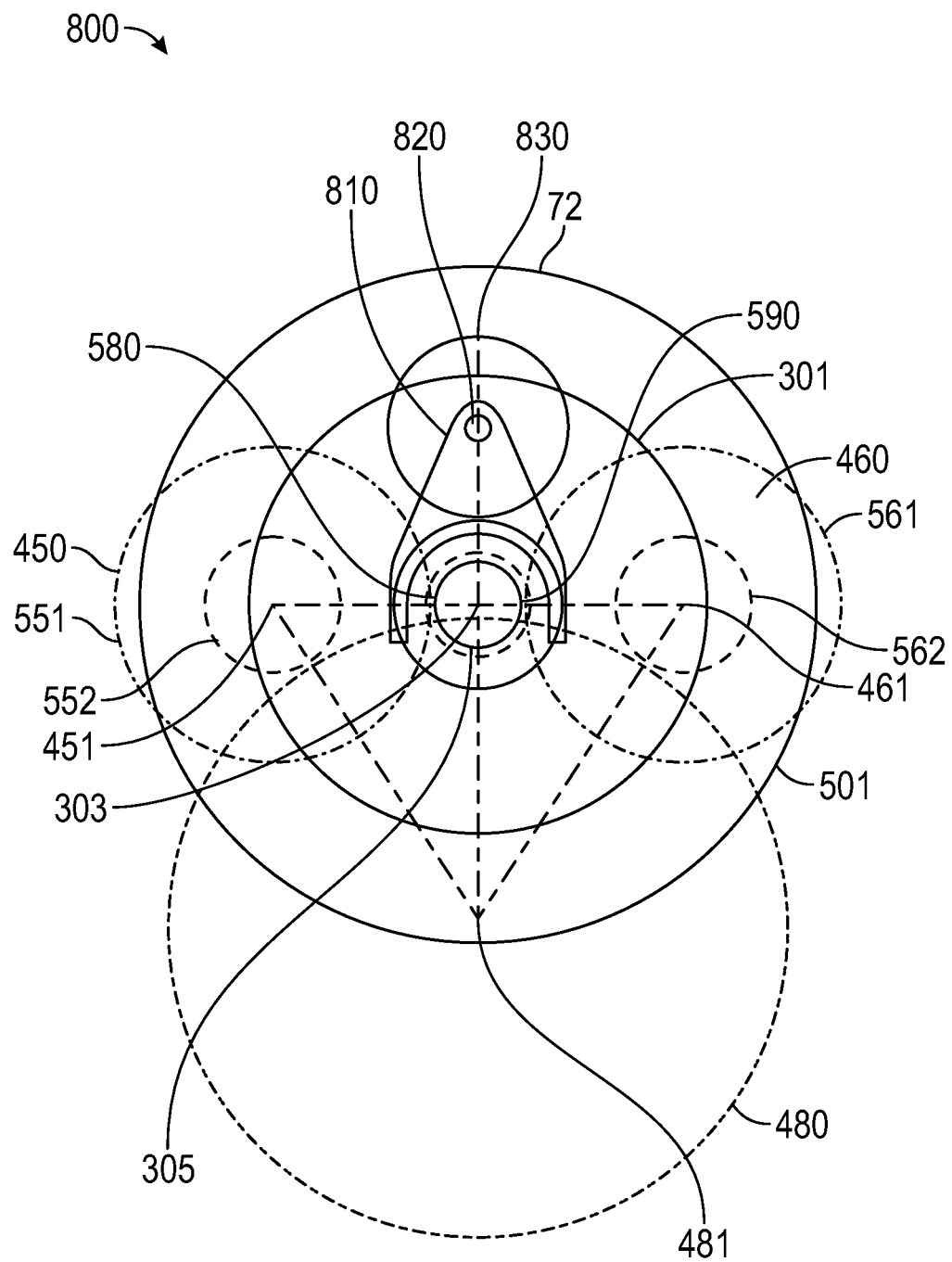
FIG. 4 is an end view schematic of the electric drive unit of FIG. 3.

Referring now to FIGS. 3 and 4, further features of the drive unit 100 are illustrated. FIG. 3 is a front view schematic, such that the view of the rear transfer shaft assemblies 450 is blocked by the front transfer shaft assemblies 460, and FIG. 4 is an end view schematic showing one rear transfer shaft assembly 450 and one front transfer shaft assembly 460. FIGS. 3 and 4 illustrate an exemplary drive unit 100 including power plant 72 and transmission system 400. In exemplary embodiments, the transmission system 400 is configured to transmit power received from the motor 72 to the wheels 64 and 65 (shown in FIG. 1) according to selectable speed ratios.

As shown in FIGS. 3 and 4, the motor 72 includes the rotor 301 and a stator 501. The stator 501 includes a stator winding 502. The electric motor 72 selectively passes an electric current through the stator winding 502 to produce a magnetic field causing the rotor 301 to rotate about the rotor axis 303.

As shown in FIG. 3, the transmission 400 includes a differential gearset or differential 600. The differential 600 operatively connects the electric motor 72 to the pinion or drive shafts 302. Thus, the differential 600 may split torque from the motor 72 into two torque paths 401 and 402.

Each drive shaft 302 extends from the differential 600 to an end 308. Further, a pinion gear 305 is coupled to or formed on the end 308 of the drive shaft 302. Each drive shaft 302 and pinion gear 305 is configured to rotate about the rotor axis 303.

FIG. 3 illustrates that each pinion gear 305 meshes with the transfer gear 561 of the respective front transfer shaft assembly 460 at an interface 590. FIG. 4 illustrates that the pinion gear 305 meshes with the transfer gear 561 of the respective front transfer shaft assembly 460 at an interface 590 and meshes with the transfer gear 551 of the respective rear transfer shaft assembly 450 at an interface 580. As shown, each rear transfer shaft assembly 450 is offset from the respective front transfer shaft assembly 460 by 180 degrees. Specifically, the pinion axis 303 is located directly between the interface 580 formed by the rear transfer shaft assembly 450 and the pinion gear 305 and the interface 590 formed by the front transfer shaft assembly 460 and the pinion gear 305. Separating the mesh interfaces 580 and 590 by 180 degrees about each pinion gear 305 yields a net zero bending load on the pinion shafts 302. The net zero bending loads on the pinon shafts 302 allow for smaller bearing for support of the shafts 302. In exemplary embodiments, the smaller bearings yield lower losses and higher efficiency.

Cross-referencing FIGS. 3 and 4, the final drive pinion 562 of each front transfer shaft assembly 460 meshes with the final drive gear 482 of the final drive assembly 480 and the final drive pinion 552 of each rear transfer shaft assembly 450 meshes with the final drive gear 482 of the final drive assembly 480. Because torque from the pinion gear 305 is shared by the transfer shaft assemblies 450 and 460, the secondary stage transfer shaft assembly reductions from each transfer shaft assembly 450 and 460 to the final drive assembly 480 also see twenty-five percent of the total motor torque each. This arrangement allows for smaller diameter transfer shaft assembly support bearings which may further minimize losses and increase efficiency.

In the illustrated embodiment of each final drive assembly 480, each final drive gear 482 is mounted on a respective drive shaft 485. Further, each final drive gear 482 and drive shaft 485 rotates about the drive axis 481.

Both front transfer shaft assemblies 460, including shafts 560, transfer gears 561, and final drive pinions 562, rotate about the front axis 461. Likewise, both rear transfer shaft assemblies 450, including shafts 550, transfer gears 551, and final drive pinions 552, rotate about the rear axis 451. As shown in FIG. 4, the rotor axis 303 is located directly between and equidistant from the front axis 461 and rear axis 451. Accordingly, rotor axis 303, front axis 461, and rear axis 451 define and lie in a single plane. In other words, there is 180 degree alignment between the front axis 461, rotor axis 303, and rear axis 451. As a result, the transmission 400 is provided with radial load cancelling.

As further shown in FIG. 4, the plane defined by the front axis 461, rear axis 451, and rotor axis 303 is perpendicular to a plane defined by the rotor axis 303 and the drive axis 481.

In FIG. 3, the drive unit 100 is provided with a bearing arrangement of ten deep groove ball bearings 307 (10 DGBB) and six cylindrical roller bearings 306 (6 CRB). Specifically, each shaft 302 is axially constrained by an internal bearing press fit wherein the shaft 302 is constrained with two deep groove ball bearings (2 DGBB); each of the two rotor pinion gears 305 is constrained with a spline/snap ring interface on one end and a deep groove ball bearing on the other (2 DGBB); each of the four transfer shaft assemblies 450 and 460 are constrained by on a deep groove ball bearing on one end (4 DGBB) and a cylindrical ball bearing on the other (4 CRB); and each of the two final drive assemblies 480 are constrained by on a deep groove ball bearing (2 DGBB) on one end and a cylindrical ball bearing on the other (2 CRB).

Figure 11:
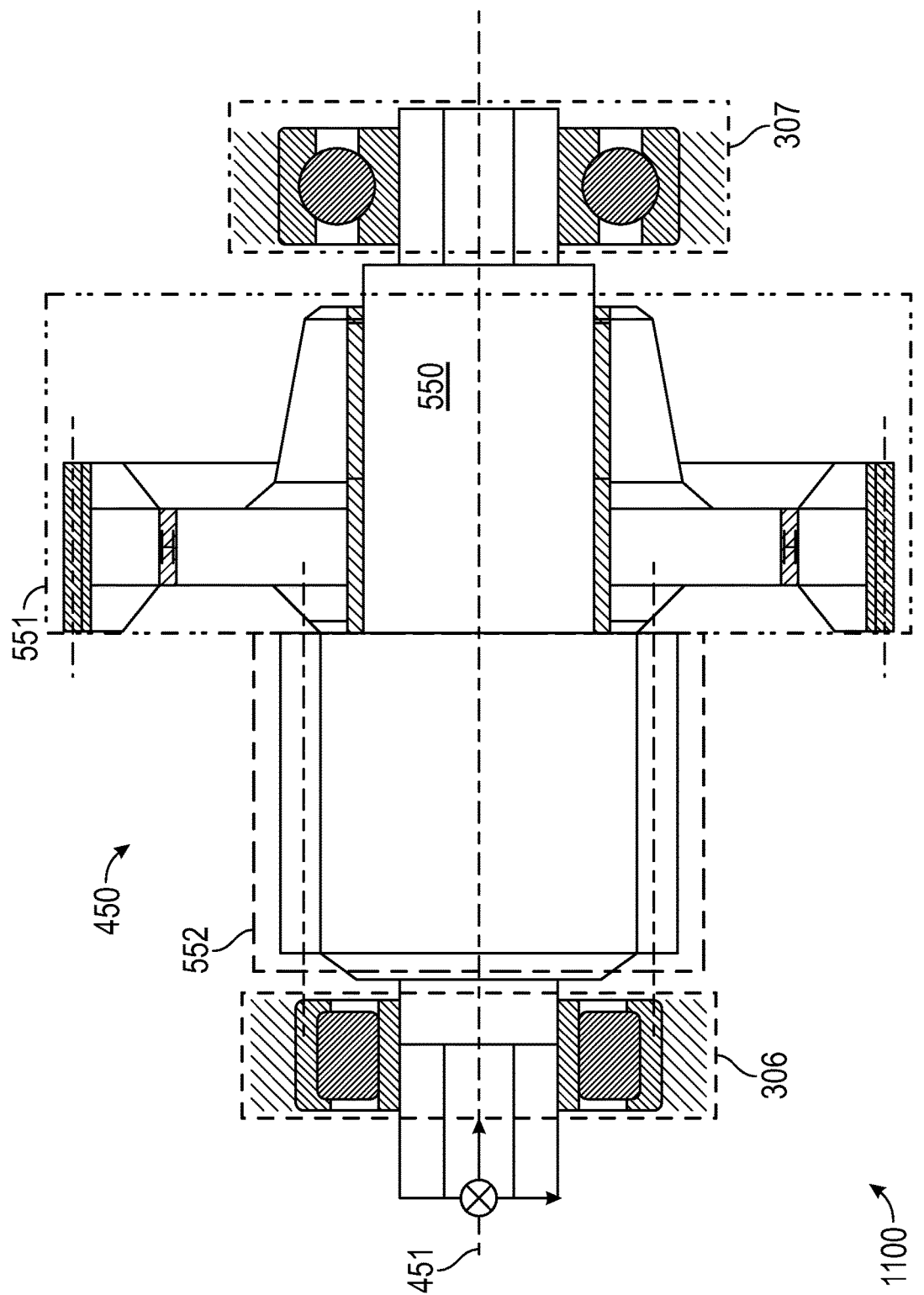
FIG. 11 is schematic focused on a bearing arrangement utilized on a transfer shaft assembly of FIG. 3, in accordance with exemplary embodiments.
Figure 12:
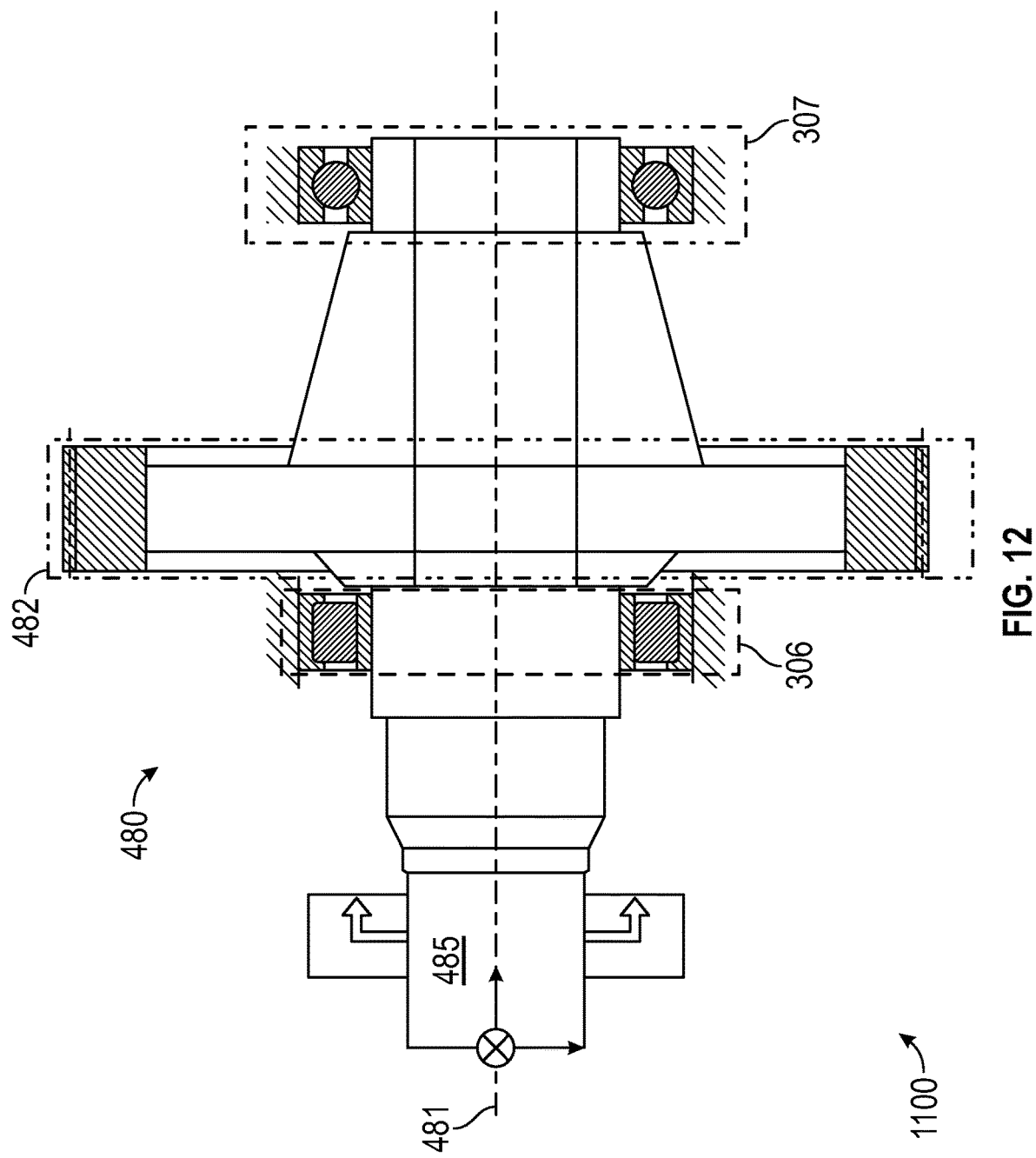
FIG. 12 is schematic focused on a bearing arrangement utilized on a final drive assembly of FIG. 3, in accordance with exemplary embodiments.

FIGS. 11 and 12 provide focused views of bearing arrangements 1100 utilized on the transfer shaft assemblies 450 and 460 and final drive assemblies 480, respectively.

FIG. 11 illustrates a bearing arrangement 1100 utilized with both of the rear transfer shaft assemblies 450 and both of the front transfer shaft assemblies 460. For simplicity of numbering, the transfer shaft assembly is described with numbering associated with rear transfer shaft assembly 450.

In FIG. 11, the transfer shaft assembly 450 comprises a transfer shaft 550, a transfer gear 551, and a final drive pinion 552. In exemplary embodiments, the transfer gear 551 is formed on or mounted to the transfer shaft 550. In exemplary embodiments, the final drive pinion 552 is formed on or mounted to the transfer shaft 550. As a result, the transfer shaft 550, transfer gear 551, and final drive pinion 552 rotate about the axis 451.

As further shown, the transfer shaft assembly 450 is provided with a bearing arrangement 1100 including deep groove ball bearings 307 adjacent to the transfer gear 551 and cylindrical roller bearings 306 adjacent to the final drive pinion 552.

FIG. 12 illustrates a bearing arrangement 1100 utilized with both of the final drive assemblies 480.

In FIG. 12, the final drive assembly 480 comprises a final drive gear 482 and a drive shaft or output shaft 485. The final drive gear 482 is configured to rotate about drive axis 481. Specifically, the final drive gear 482 is coupled or mounted to the drive shaft or output shaft 485 rotatable about drive axis 481.

As further shown, final drive assembly 480 is provided with a bearing arrangement 1100 including deep groove ball bearings 307 and cylindrical roller bearings 306. As shown, the final drive gear 482 is located between the deep groove ball bearings 307 and cylindrical roller bearings 306, with the output shaft 485 extending away from the cylindrical roller bearings 306.

While FIGS. 11 and 12 illustrate an embodiment of a bearing arrangement 1100, other suitable arrangements may be utilized. For example, taper roller bearings, needle roller bearings, four-point bearings, or other suitable bearings may be used.

Referring back to FIG. 3, the drive unit 100 further includes a locking device 800 configured to selectively connect and disconnect the input differential housing 650 from the first pinion shaft 302. Specifically, in the embodiment of FIG. 3, the locking device 800 includes an axially actuatable fork 810 configured to move along a fork axis 820 parallel to the rotor axis 303.

Figure 5:
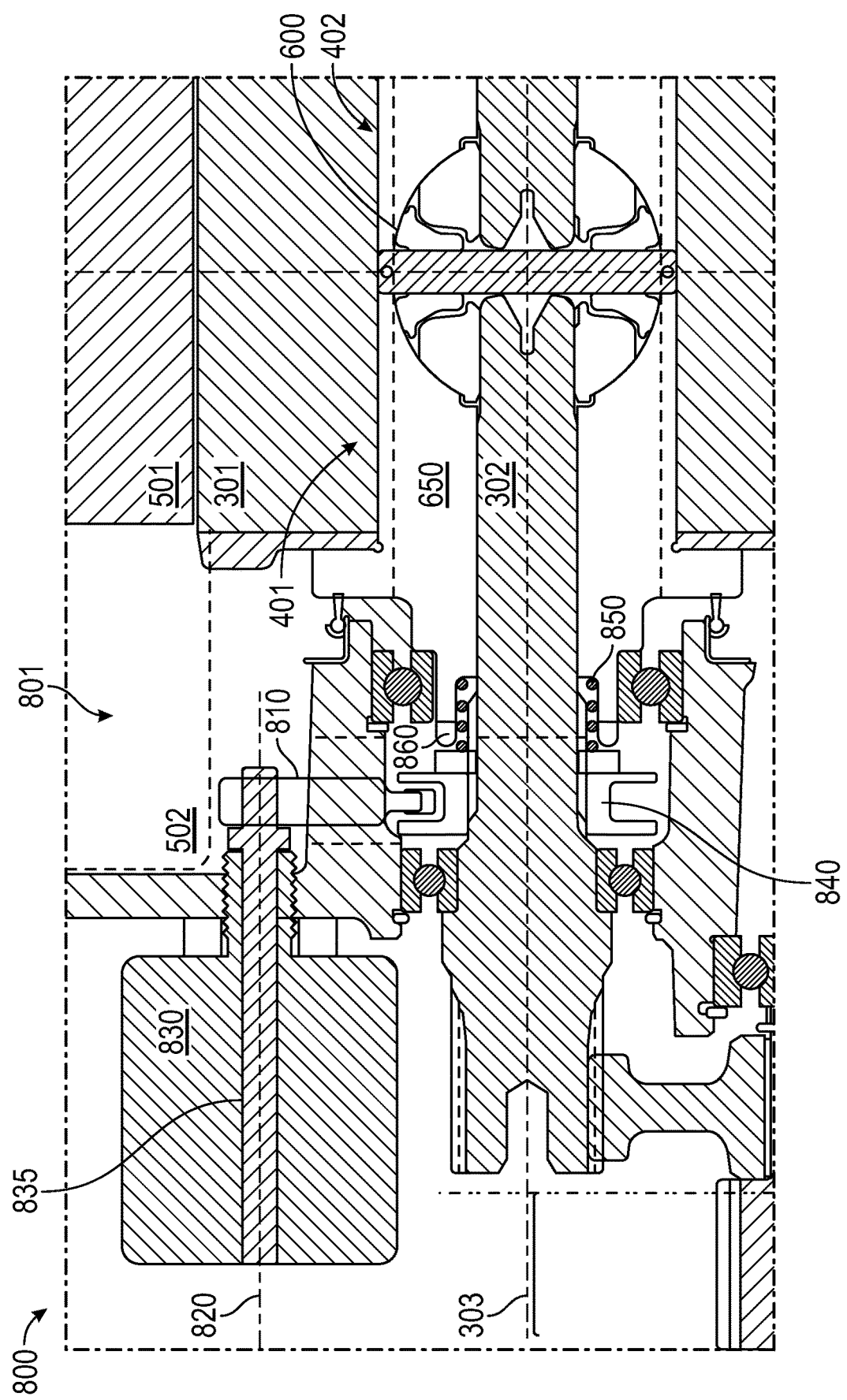
FIG. 5 is a focused front view schematic of the locking device of the electric drive unit of FIG. 3 in an unlocked configuration, in accordance with exemplary embodiments.
Figure 6:
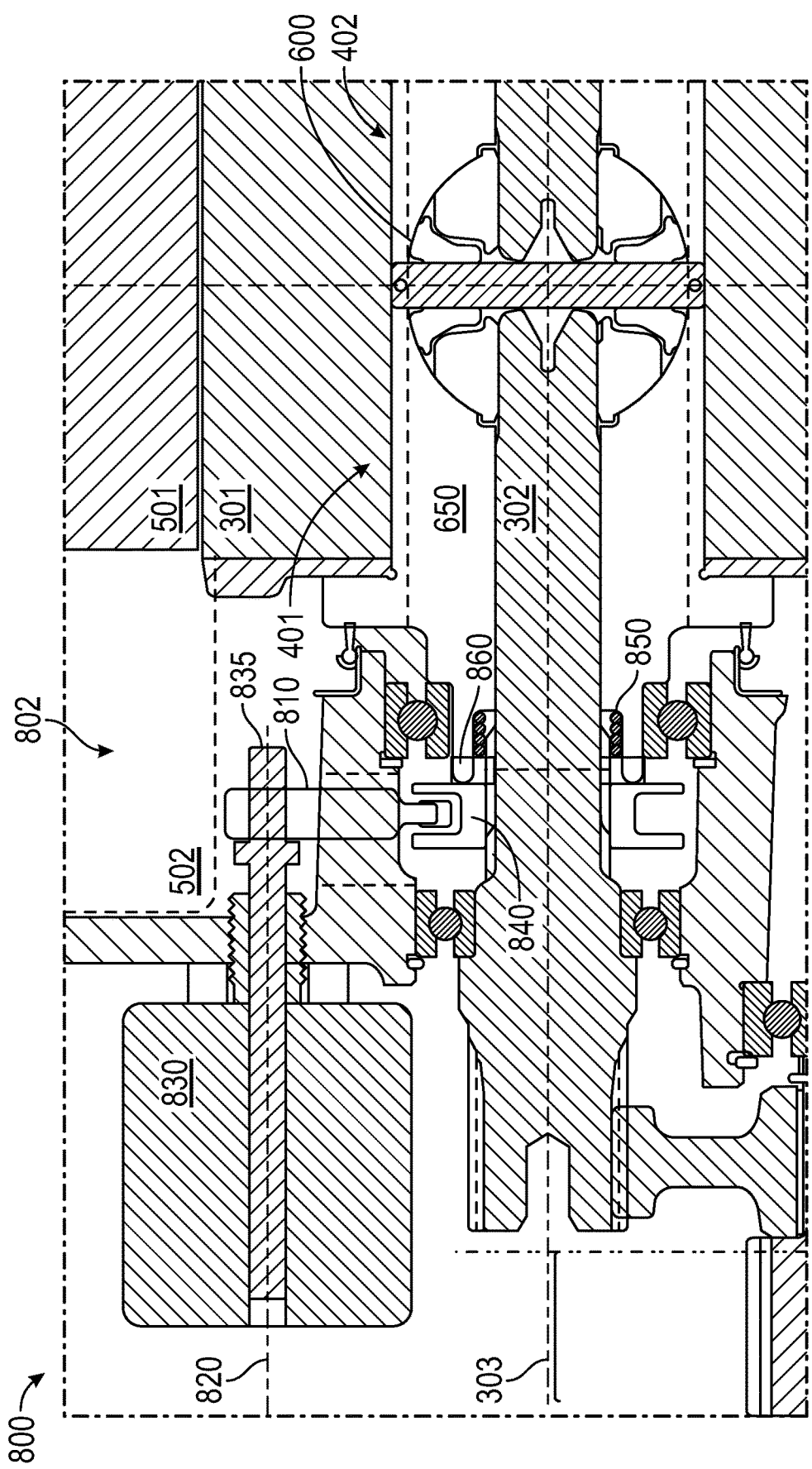
FIG. 6 is a focused front view schematic of the locking device of the electric drive unit of FIG. 3 in a locked configuration, in accordance with exemplary embodiments.

Cross-referencing FIGS. 3, 5 and 6, further features of the locking device 800 are illustrated. In FIG. 5, the locking device is in an unlocked configuration 801. In FIG. 6, the locking device 800 is in a locked configuration 802.

As shown, the exemplary locking device 800 includes a linear actuator 830 and shaft 835 for moving the fork 810 along the fork axis 820. Further, the locking device 800 includes a sliding collar 840 positioned around the pinion shaft 302. The collar 840 includes axially-extending teeth and is configured to move axially, i.e., along axis 303, but relative rotation between the collar 840 and the shaft 302 is prohibited.

Further, the exemplary locking device 800 includes a biasing element 850, such as a spring, biased to extend to push the collar 840 to the unlocked configuration 801 shown in FIG. 5. Also, the locking device 800 includes a projection 860 formed on the differential housing 650 and coupled to the differential 600.

As shown in FIG. 6, locking device 800 is in the locked configuration 802 in which the linear actuator 830 has advanced the fork 810 along axis 820, causing the collar 840 to advance along axis 303 such that the collar 840 compresses the biasing element 850 and engages the projection 860 of the differential housing 650. Specifically, the axially-extending teeth of the collar 840 may engage the projection 860. Due to the engagement between the projection 860 and the collar 840, the collar 840 and shaft 302 are locked to the projection 860. Thus, the collar 840 and shaft 302 are locked to and rotate with the differential housing 650.

When the locking device 800 retracts the fork 810 to the unlocked configuration of FIG. 5, the fork 810 and/or the biasing element 850 move the collar 840 out of connection with the projection 860. As a result, the collar 840 and shaft 302 are disconnected from the projection 860 and unlocked from the differential housing 650. Thus, the differential 600 is open and may split torque along both paths 401 and 402.

Cross-referencing FIGS. 3, 5, and 6, the fork 810, is located directly between the drive shaft 302 and the stator windings 502 of the stator 501. Further, the axis 820 of the locking device 800 passes through the rotor 301, and is not co-axial with the rotor axis 303.

Figure 7:
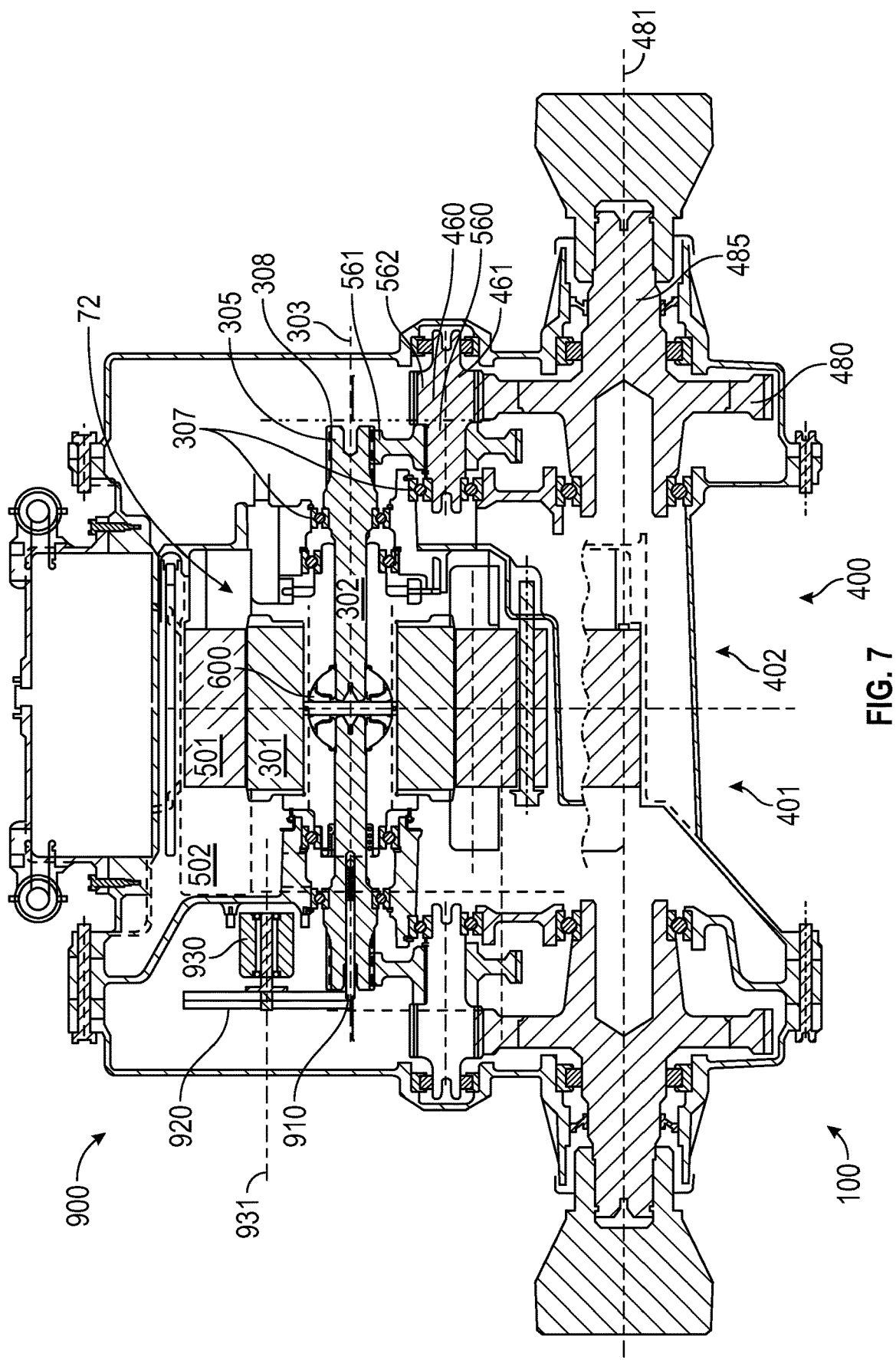
FIG. 7 is a front view schematic of the electric drive unit of FIG. 2, in accordance with exemplary embodiments.
Figure 8:
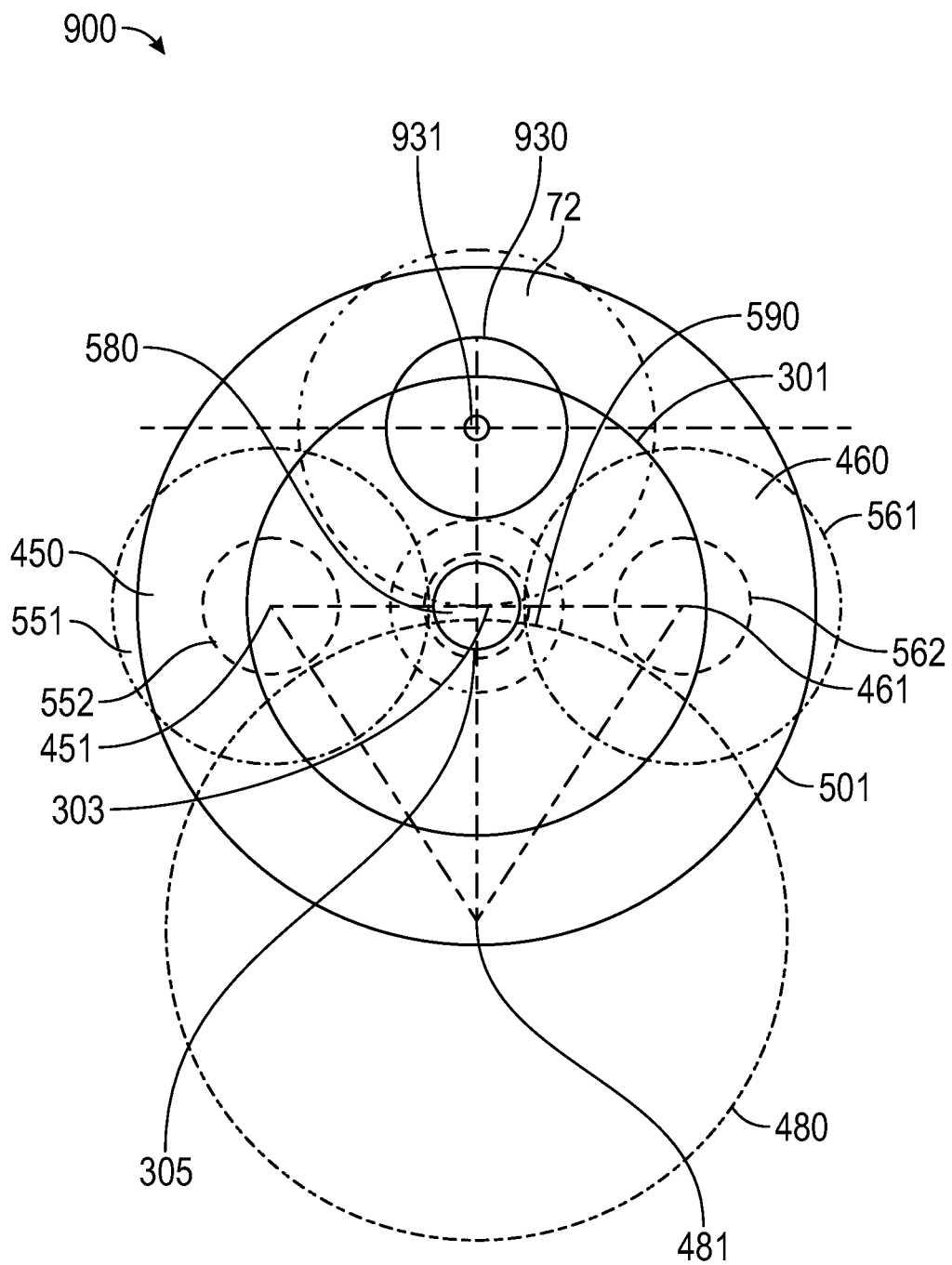
FIG. 8 is an end view schematic of the electric drive unit of FIG. 7.
Figure 9:
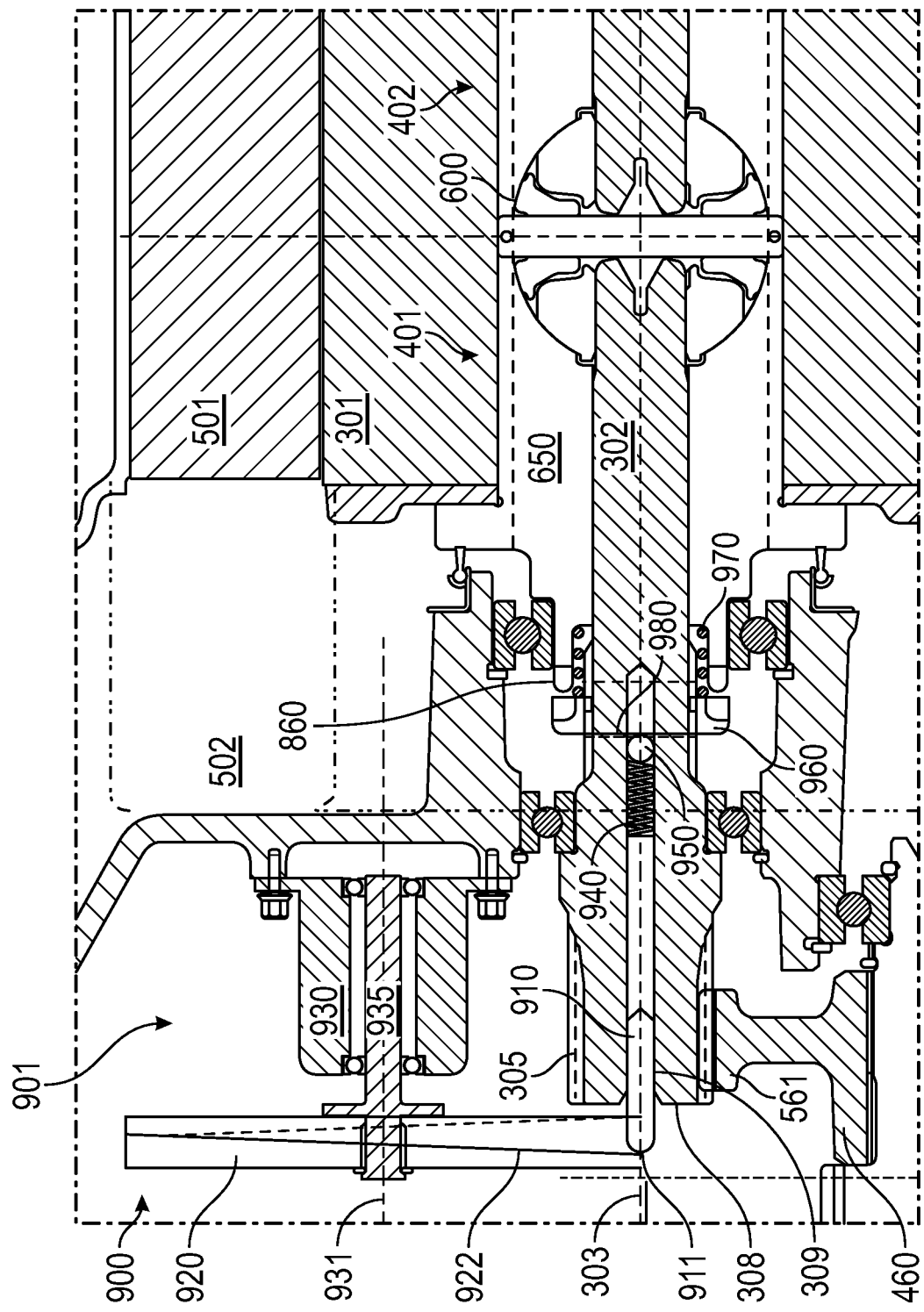
FIG. 9 is a focused front view schematic of the locking device of the electric drive unit of FIG. 7 in an unlocked configuration, in accordance with exemplary embodiments.
Figure 10:
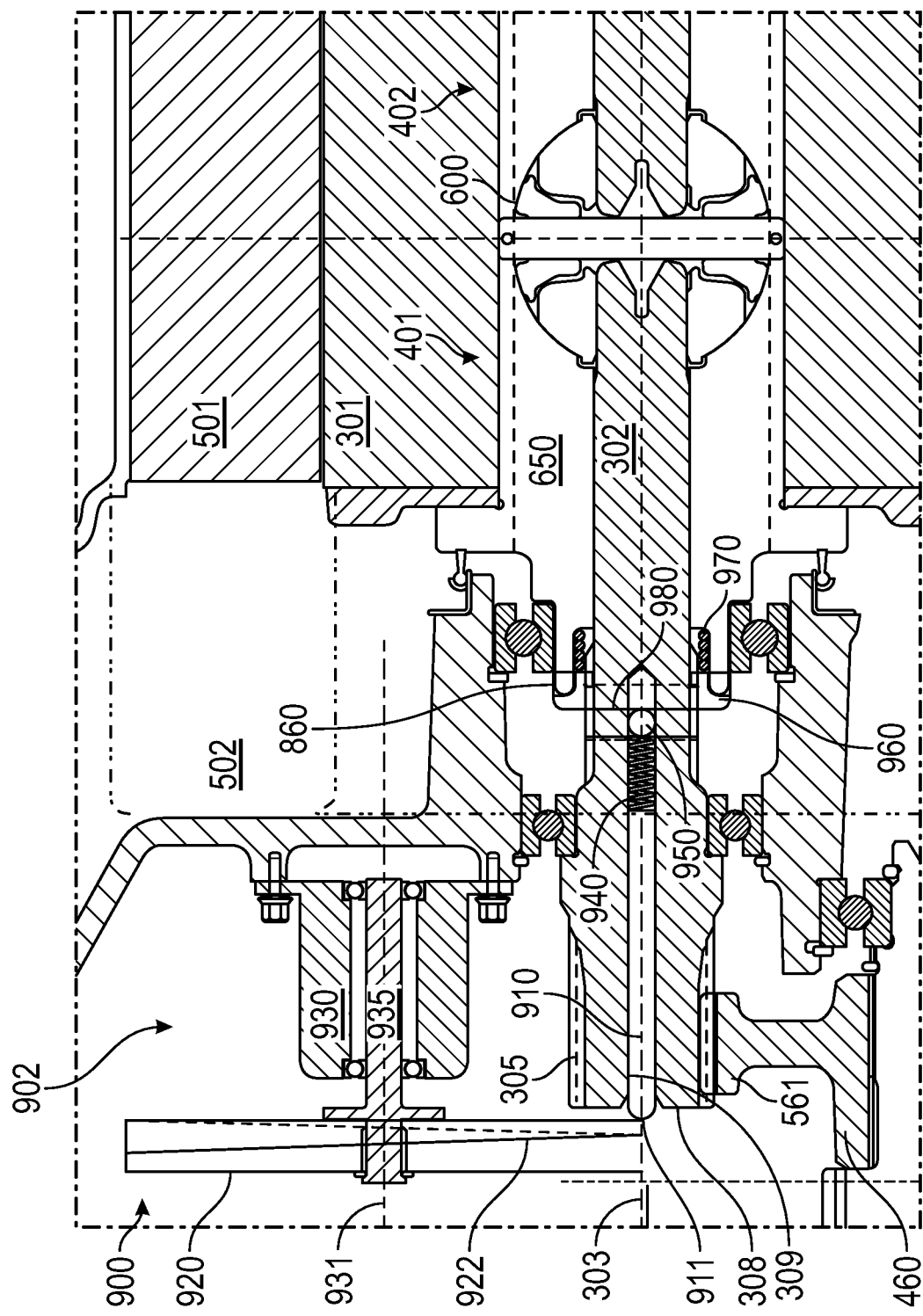
FIG. 10 is a focused front view schematic of the locking device of the electric drive unit of FIG. 7 in a locked configuration, in accordance with exemplary embodiments.

The drive unit 100 of FIGS. 7-10 includes a similar motor 72 and transmission 400 as the embodiment illustrated in FIGS. 3-6, but is provided with another embodiment of a locking device 900. FIG. 7 is a front schematic view of the drive unit 100, similar to FIG. 3. FIG. 8 is an end view schematic of the electric drive unit 100. FIG. 9 is a focused front view schematic of the locking device 900 in an unlocked configuration 901. FIG. 10 is a focused front view schematic of the locking device 900 in a locked configuration 902.

Cross-referencing FIGS. 7-10 and as most clearly seen in FIG. 9-10, the locking device 900 includes an axially actuatable shaft 910 coaxial with the pinion shaft 302 and located within the pinion shaft 302. Specifically, the pinion shaft 302 is formed with an axial bore 309 that extends from the end 308 toward the differential 600, and the axially actuatable shaft 910 is received within the bore 309. Thus, the axially actuatable shaft 910 rotates with the pinion shaft 302. Further, the locking device 900 includes a torque-to-thrust rotary mechanism 920 configured to the move the axially actuatable shaft 910 between the unlocked configuration 901 and the locked configuration 902. In an exemplary embodiment, the torque-to-thrust rotary mechanism 920 has an eccentric face 922 for contacting the axially actuatable shaft 910. As shown, the contact between the torque-to-thrust rotary mechanism 920 and axially actuatable shaft 910 occurs at a rounded end 911 of the axially actuatable shaft 910 to provide a point contact and minimize rubbing friction. Also, the locking device 900 includes a rotary shift motor 930 configured to provide a high-torque low-speed output to rotate a shaft 935 coupled to the torque-to-thrust rotary mechanism 920. The shaft 935 and torque-to-thrust rotary mechanism 920 rotate about an axis 931.

As shown, the locking device 900 may include a compressible member 940, such as a spring, a ball 950, a collar 960, a biasing member 970, such as a spring, and a pin 980. The pin 980 is configured to connect the ball 950 to the collar 960 and to ride in a slot in the pinion shaft 302. In FIG. 9, the axially actuatable shaft 910 is retracted. In FIG. 10, the rotary shift motor 930 has caused the torque-to-thrust rotary mechanism 920 to rotate 180 degrees to cause the axially actuatable shaft 910 to advance into the bore 309. As result, the ball 950 is pushed by the spring 940 deeper into the bore 309. As a result, the pin 980 is pushed in the same direction, causing the collar 960 to move into engagement with the projection 860 of the differential housing 650. For example, teeth formed on the collar 960 may engage the projection 860. As a result, the collar 960 and shaft 302 are locked to the differential housing 650.

Further rotation of the torque-to-thrust rotary mechanism 920 causes the axially actuatable shaft 910 to be retracted from the bore 309. Biasing element 970 may then force the disengagement of the collar 960 from the projection 860 of the differential housing 650 such that the locking device 900 returns to the unlocked configuration 901 of FIG. 9. Thus, the differential 600 is open and may split torque along both paths 401 and 402.

Accordingly, a number of embodiments of electric drive units are provided with compact structures and compact arrangements. In exemplary embodiments, motor torque is split into two paths. Within each path, torque is again split between two transfer shaft assemblies that both are configured to power a same final drive gear. The meshes between each pinion gear and transfer shaft assembly pairs are arranged at 180 degree opposite angles which yields a net zero radial load on the pinion shafts. The net zero radial loads on the pinon shafts allows for smaller bearing for support of the shafts. The smaller bearings yield lower losses and higher efficiency. Further, the secondary stage transfer shaft assembly reductions to the final drive ring gears also carry twenty-five percent of the total torque each. This provides for smaller diameter transfer shaft assembly support bearings which further minimize losses and increase efficiency.

In certain embodiments, the drive unit architecture described herein provides for up to 95% efficiency. In certain embodiments, the drive unit architecture described herein eliminates or reduces radial loads on motor pinion shafts. In certain embodiments, the drive unit architecture described herein minimizes loads on individual gears and reduces the required size of such gears. In certain embodiments, the drive unit architecture described herein provides for minimum bearing losses. In certain embodiments, the drive unit architecture described herein provides for a locking device to an upstream differential, i.e., between the motor and the gearing. In certain embodiments, the drive unit architecture described herein minimizes the mass of the differential. In certain embodiments, the drive unit architecture described herein may be utilized with chassis-mounted and beam-mounted applications.

In summary, embodiments herein provide for minimum stress/maximum load sharing for the gears and differential while. Further embodiments provide for separating load cancellation, for minimum bearing loads, and for an upstream differential which is further provided with a locking device. In certain embodiments, an electric drive unit features a motor enclosed in a rotor with four transfer axles on two axes, four total axes, two final drive rings gears, and a locking differential.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An electric drive unit comprising:
an electric motor configured to provide an electric motor torque;
an input differential configured to split the electric motor torque into a first path and a second path;
a first final drive gear on the first path and a second final drive gear on the second path;
a first pinion gear on the first path and a second pinion gear on the second path;
a first rear transfer shaft assembly and a first front transfer shaft assembly on the first path; and
a second rear transfer shaft assembly and a second front transfer shaft assembly on the second path;
wherein the first pinion gear is configured to transfer torque to the first rear transfer shaft assembly and to the first front transfer shaft assembly;
wherein the first rear transfer shaft assembly and the first front transfer shaft assembly are both configured to transfer torque to the first final drive gear;
wherein the second pinion gear is configured to transfer torque to the second rear transfer shaft assembly and the second front transfer shaft assembly;
wherein the second rear transfer shaft assembly and the second front transfer shaft assembly are both configured to transfer torque to the second final drive gear;
wherein the first pinion gear engages with the first rear transfer shaft assembly at a first rear interface and engages with the first front transfer shaft assembly at a first front interface; and
wherein the first rear interface and the first front interface are separated by 180 degrees about the first pinion gear to yield a net zero bending load on the first pinion gear.

2. The electric drive unit of claim 1, wherein:
each pinion gear rotates about a pinion axis;
each rear transfer shaft assembly rotates about a rear axis;
each front transfer shaft assembly rotates about a front axis;
the pinion axis, the rear axis, and the front axis lie in a same plane; and
the pinion axis is located between the rear axis and the front axis.

3. The electric drive unit of claim 1, wherein:
each transfer shaft assembly comprises a transfer gear and a final drive pinion, wherein the transfer gear and the final drive pinion are mounted on a transfer shaft;
each transfer gear meshes with a respective pinion gear; and
each final drive pinion meshes with a respective final drive gear.

4. The electric drive unit of claim 3, wherein:
the transfer shaft of the first rear transfer shaft assembly and the transfer shaft of the second rear transfer shaft assembly both rotate about a rear axis; and
the transfer shaft of the first front transfer shaft assembly and the transfer shaft of the second front transfer shaft assembly both rotate about a front axis.

5. The electric drive unit of claim 1, wherein:
the input differential is configured to transfer torque to a first pinion shaft and a second pinion shaft;
the first pinion shaft and the second pinion shaft rotate about a first axis;
the first pinion gear is mounted on the first pinion shaft; and
the second pinion gear is mounted on the second pinion shaft.

6. The electric drive unit of claim 1, wherein;
each pinion gear rotates about a pinion axis;
each rear transfer shaft assembly rotates about a rear axis;
each front transfer shaft assembly rotates about a front axis;
the pinion axis, the rear axis, and the front axis define and lie in a single plane; and
the pinion axis is located directly between and equidistant from the front axis and the rear axis.

7. The electric drive unit of claim 1, wherein:
the first pinion gear is configured to split torque between the first rear transfer shaft assembly and the first front transfer shaft assembly such that the first rear transfer shaft assembly carries twenty-five percent of the electric motor torque and the first front transfer shaft assembly carries twenty-five percent of the electric motor torque; and the second pinion gear is configured to split torque between the second rear transfer shaft assembly and the second front transfer shaft assembly such that the second rear transfer shaft assembly carries twenty-five percent of the electric motor torque and the second front transfer shaft assembly carries twenty-five percent of the electric motor torque.

8. The electric drive unit of claim 1, further comprising a locking device configured to selectively connect and disconnect the input differential from the first pinion gear.

9. The electric drive unit of claim 8, wherein:
the input differential is configured to transfer torque to a first pinion shaft;
the locking device comprises an axially actuatable shaft coaxial with the first pinion shaft and located within the first pinion shaft.

10. The electric drive unit of claim 9, wherein the locking device comprises a torque-to-thrust rotary mechanism configured to the move the axially actuatable shaft between an unlocked configuration and a locked configuration, and wherein the locking device comprises a rotary shift motor configured to rotate the torque-to-thrust rotary mechanism.

11. The electric drive unit of claim 8, wherein
the first pinion shaft is formed with an axial bore; and
the axially actuatable shaft is located within the axial bore of the pinion shaft.

12. The electric drive unit of claim 8, wherein:
the input differential is configured to transfer torque to a first pinion shaft rotatable about a first axis; and
the locking device comprises an axially actuatable fork configured to move along a fork axis parallel to the first axis.

13. The electric drive unit of claim 1, wherein:
the input differential is configured to transfer torque to a first pinion shaft and a second pinion shaft;
each pinion shaft is axially constrained by an internal bearing press fit.

14. The electric drive unit of claim 1, further comprising a bearing arrangement of ten deep groove ball bearings and six cylindrical roller bearings.

15. An electric drive unit comprising:
an electric motor configured to provide an electric motor torque;
an input differential;
a pinion gear, wherein the input differential is configured to selectively transmit torque to the pinion gear;
a rear transfer shaft assembly and a front transfer shaft assembly, wherein the pinion gear is configured to transfer torque to the rear transfer shaft assembly and to the front transfer shaft assembly;
a final drive gear, wherein the rear transfer shaft assembly and the front transfer shaft assembly are both configured to transfer torque to the same final drive gear; and
a locking device configured to selectively connect and disconnect the input differential from the pinion gear, wherein:
the input differential is configured to transfer torque to a pinion shaft;
the pinion shaft is formed with an axial bore; and
the locking device comprises an axially actuatable shaft coaxial with the pinion shaft and located within the axial bore of the pinion shaft.

16. The electric drive unit of claim 15, wherein:
the pinion gear rotates about a pinion axis;
the pinion gear meshes with the rear transfer shaft assembly at a rear interface;
the pinion gear meshes with the front transfer shaft assembly at a front interface; and
the pinion axis is located between the rear interface and the front interface.

17. A vehicle comprising:
an electric motor configured to provide an electric motor torque;
a first pinion gear on a first path and a second pinion gear on a second path;
a first rear transfer shaft assembly on the first path and a second rear transfer shaft assembly on the second path;
a first front transfer shaft assembly on the first path and a second front transfer shaft assembly on the second path;
a first final drive gear on the first path and a second final drive gear on the second path; and
a first wheel on the first path and a second wheel on the second path;
wherein the first pinion gear is configured to transfer torque to the first rear transfer shaft assembly and the first front transfer shaft assembly;
wherein the first rear transfer shaft assembly and the first front transfer shaft assembly are both configured to transfer torque to the first final drive gear, and the first final drive gear is configured to drive the first wheel;
wherein the second pinion gear is configured to transfer torque to the second rear transfer shaft assembly and the second front transfer shaft assembly;
wherein the second rear transfer shaft assembly and the second front transfer shaft assembly are both configured to transfer torque to the second final drive gear, and the second final drive gear is configured to drive the second wheel; and
wherein torque from each pinion gear is split between the respective rear and front transfer shaft assemblies such that each transfer shaft assembly carries twenty-five percent of total motor torque.

18. The vehicle of claim 17, wherein:
the first pinion gear rotates about a first pinion axis;
the first pinion gear meshes with the first rear transfer shaft assembly at a first rear interface;
the first pinion gear meshes with the first front transfer shaft assembly at a first front interface;
the first pinion axis is located between the first rear interface and the first front interface.

19. The vehicle of claim 17, wherein:
the first pinion gear engages with the first rear transfer shaft assembly at a first rear interface and engages with the first front transfer shaft assembly at a first front interface;
the first rear interface and the first front interface are separated by 180 degrees about the first pinion gear to yield a net zero bending load on the first pinion gear.

20. The vehicle of claim 17, further comprising:
an input differential configured to split the electric motor torque into the first path and the second path;
a pinion shaft configured to receive torque from the input differential, wherein the pinion shaft is formed with an axial bore; and a locking device configured to selectively connect and disconnect the input differential from the pinion shaft, wherein the locking device comprises an axially actuatable shaft coaxial with the pinion shaft and located within the axial bore of the pinion shaft.

* * * * *